June 26, 1928.

H. E. KELLOGG

PUMP BEARING

Filed Jan. 2, 1925

INVENTOR

Henry E. Kellogg

BY John A. Naismith

ATTORNEY

Patented June 26, 1928.

1,675,177

UNITED STATES PATENT OFFICE.

HENRY E. KELLOGG, OF MOUNTAIN VIEW, CALIFORNIA.

PUMP BEARING.

Application filed January 2, 1925. Serial No. 120.

It is the object of the present invention to provide a bearing for a vertical pump shaft wherein the lubricant is effectually trapped within the bearing in such a manner as to effectively lubricate the same at all times and prevent access of erosive material, such as sand, thereto.

In the drawing:—

Figure 1:
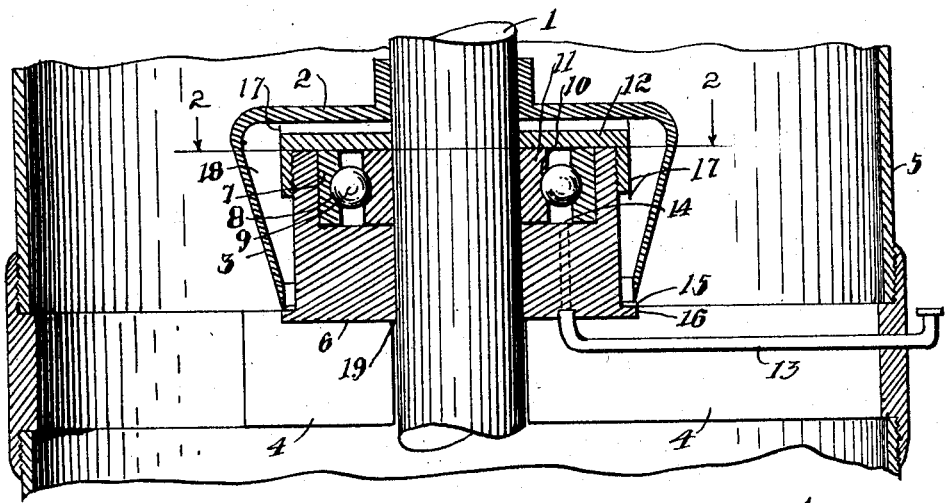
Figure 1 is a vertical transverse section through a portion of a pump embodying my invention.
Figure 2:
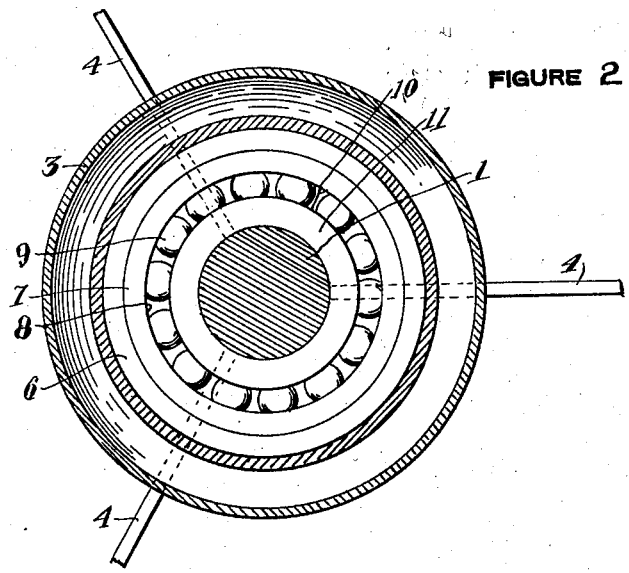
Figure 2 is a section on 2—2 of Figure 1.

Referring more particularly to the drawing, 1 indicates a pump shaft having a flange 2 securely mounted thereon in any suitable manner such as by shrinking thereon, this flange 2 carrying a depending and inwardly projected skirt 3.

At 4 are webs carried by discharge casing 5 and in turn carrying a bearing member 6 in which is seated ring 7 provided with a race 8 for balls 9 which also engage race 10 in ring 11 mounted on shaft 1. These elements are covered with a suitable cap 12 screwed on to the top of members 6 as shown.

It is obvious that when shaft 1 rotates the part 2—3 and parts 9—10—11 rotate therewith while parts 4 to 8 inclusive, and 12, are stationary.

A suitable lubricant is fed into the bearing through a tube 13 which communicates with the bearing between rings 7 and 11 as indicated at 14.

Since the lower edge of the skirt 3 is below the bearings 7—11 the lubricant will at all times completely submerge the contacting movable parts.

When the pump is in operation and the shaft 1 rotated at high speed the water itself acts as a seal to prevent escape of the lubricant. Entering through the slot 15 between the lower edge of skirt 3 and flange 16 on member 6 the water crawls up the inner surface of skirt 3 until it approaches the vertical line 17. The centrifugal force generated by the revolving members maintains the water in this position and consequently there is no way in which the lubricant can escape.

The lubricant will, of course, make its way past the cap 12 into the upper portion of the skirt member 2—3, but the ebb and flow of the water through slot 15 as the speed of the revolving shaft 1 fluctuates will keep the space 18 between skirt 3 and member 6 filled with water and effectually prevent the escape of lubricant at this point, and yet the centrifugal force imparted to the water will effectually prevent its reaching the ball bearings and forcing the lubricant therefrom. If any lubricant escapes it will be only as a slight discharge from around the shaft 1 at 19.

It is to be understood, of course, that while I have herein shown and described one specific embodiment of the invention, changes in form, construction and method of operation may be made within the scope of the appended claims.

I claim:—

1. The combination with a shaft bearing having the outer periphery of its upper end circular in form, of an inverted cup member mounted on the shaft engaging said bearing to revolve therewith and encompassing said bearing, the bottom of said cup having an inner diameter greater than the exterior diameter of the upper end of the bearing, and the mouth of the cup having an inner diameter substantially equal to the exterior diameter of the upper end of the bearing.

2. In combination, a shaft bearing having an annular outer periphery and provided with an outwardly extending flange a distance below its upper end, and an inverted cup member mounted on the shaft engaging said bearing to revolve therewith and encompassing said bearing, the upper end of said cup extending outwardly a distance beyond the upper end of said bearing and its mouth having an inner diameter substantially equal to the exterior diameter of the upper end of the bearing and closely approaching the upper surface of said flange.

HENRY E. KELLOGG.